Figures 1, 2:
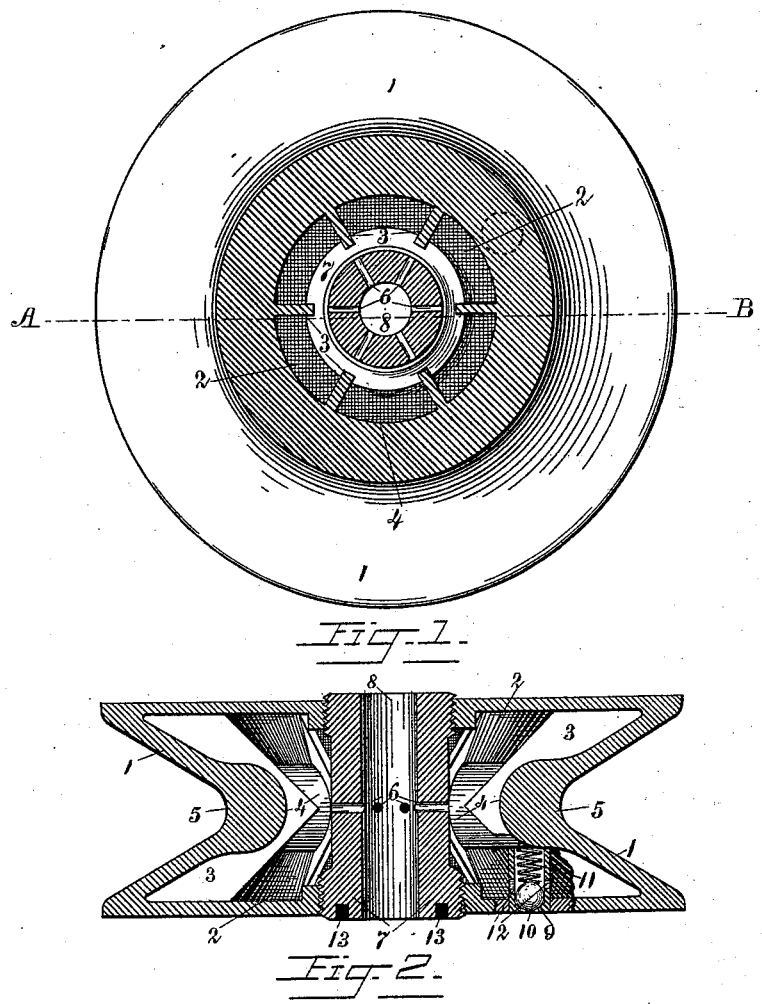

(No Model.)

F. LEPPER & W. WIGHTON.
TROLLEY WHEEL.

No. 529,829. Patented Nov. 27, 1894.

WITNESSES
A. Dixon
Albert A. Beares

INVENTORS
Frederick Lepper
William Wighton
per W. J. Graham
Atty.

UNITED STATES PATENT OFFICE.

FREDERICK LEPPER AND WILLIAM WIGHTON, OF TORONTO, CANADA.

TROLLEY-WHEEL.

SPECIFICATION forming part of Letters Patent No. 529,829, dated November 27, 1894.

Application filed September 22, 1893. Serial No. 486,171. (No model.)

*To all whom it may concern:*

Be it known that we, FREDERICK LEPPER and WILLIAM WIGHTON, both of the city of Toronto, in the county of York and Province of Ontario, Canada, have invented certain new and useful Improvements in Trolley-Wheels for Electrical Railway-Motors, of which the following is a specification.

The objects of our invention are, first, to provide means for prolonging the usefulness or life of a trolley wheel by providing for renewing the central bearing of the wheel, which is generally worn out first, and where no means of renewing the same exists, the wheel, in other respects in good condition, has to be removed; secondly, to provide a trolley wheel in which frequency of oiling is reduced to a minimum, as our wheel is hollow and provides for carrying a considerable amount of oil to lubricate the axle at the center; and thirdly, to provide means for the lubrication of the wheel automatically on every stoppage of the wheel.

We accomplish the foregoing objects by the means illustrated in the accompanying drawings, in which similar numbers of reference refer to similar parts throughout.

Figure 1, represents a central section through our improved wheel, on the same plane as that of its groove, and Fig. 2, represents a transverse section of a complete wheel according to our invention, on the line A—B of foregoing figure.

Our improved wheel, 1, is hollow or internally cored out so as to form a chamber, 2, therein, which chamber, 2, is divided by walls, 3, into a number of segments, at the internally projecting ridge, 4. The ridge, 4, is the interior projection of the groove, 5, in the outer face of the wheel, and which groove, 5, the wire occupies. The walls, 4, are pointed toward the center so as to form angles from which the oil drops (from those on the upper side of the wheel) into oil holes, 6, in the bushing, 7, at the center of the wheel, 1, when the wheel is at rest. The bushing, 7, is tapered and threaded externally at its ends, to fit the axial opening in the wheel, 1, which is threaded to suit or fit the bushing, 7. In the bushing, 7, is an axial opening, 8, into which the oil holes, 6, extend, and in this opening, 8, the pin or axle on which the wheel, 1, is supported is placed and lubricated fully by oil from the chamber, 2, finding its way through the oil holes, 6.

In one side of the wheel, 1, and clear of any interference with the bushing, 7, is secured an inlet valve, 9, through which the spout of an oiler is introduced to supply oil. The valve, 9, consists of a piece of tube having its outer end partly closed so as to form a seat against which a small rubber ball, 10, is held by means of a spiral spring, 11, supported at its rear by the ridge, 4, against which the valve, 9, and spring, 11, rest. The valve, 9, has a series of holes, 12, formed in it just in rear of the ball, 10, to allow the oil poured in to find its way out of the valve, 9, and into the chamber, 2.

In the larger end of the bushing, 7, are two, three, or four holes, 13, into which a tool having adapted studs or pins to fit into said holes, 13, is applied, to remove and insert the bushing, 7.

Having described our invention, what we claim, and desire to secure by Letters Patent, is—

A trolley-wheel comprising the body portion having an exterior wire-receiving groove, and a chamber divided by integral radial walls or ridges 4 into a plurality of segments, said walls extending from the interior projection of said groove and tapered upon opposite sides toward the center of the wheel and said tapers extending upon both sides from the peripheral edge of the walls to the central point and at right angles to the axis of the wheel, a hollow bushing in the center of the wheel with radial openings opposite the points of said walls and in the same radial line, said points extending into close proximity to the said openings, a tube seated in an opening in the side of the wheel and having a plurality of openings near its rear end, a rubber ball valve arranged in said tube and adapted to be seated against the partially closed outer end thereof and the spring bearing against the ball and at its inner end supported by one of the ridges 4 against which also said tube rests at its inner end, substantially as shown and described.

FREDERICK LEPPER.
WILLIAM WIGHTON.

Witnesses:
LARRATT W. SMITH,
HENRY HARTMAN.